(12) United States Patent
Ota et al.

(10) Patent No.: US 10,543,750 B2
(45) Date of Patent: Jan. 28, 2020

(54) VEHICLE

(71) Applicant: Toyota Jidosha Kabushiki Kaisha, Toyota-shi, Aichi-ken (JP)

(72) Inventors: Yoshifumi Ota, Okazaki (JP); Shuichi Nagata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 74 days.

(21) Appl. No.: 15/817,745

(22) Filed: Nov. 20, 2017

(65) Prior Publication Data
US 2018/0154778 A1 Jun. 7, 2018

(30) Foreign Application Priority Data
Dec. 1, 2016 (JP) .................... 2016-234294

(51) Int. Cl.
*B60L 8/00* (2006.01)
*B60L 11/18* (2006.01)
(Continued)

(52) U.S. Cl.
CPC ............... *B60L 8/003* (2013.01); *B60L 1/006* (2013.01); *B60L 58/13* (2019.02); *B60L 58/20* (2019.02); *B60W 10/26* (2013.01); *B60W 20/13* (2016.01); *H02J 7/0068* (2013.01); *H02J 7/35* (2013.01); *H02S 20/30* (2014.12); *B60L 2210/10* (2013.01); *B60L 2240/54* (2013.01); *B60L 2240/545* (2013.01); *H02J 7/0054* (2013.01);
(Continued)

(58) Field of Classification Search
CPC .......... H02S 10/20; H02S 10/40; H02S 40/38; B60L 8/003; B60L 58/20; B60L 58/13; B60L 1/006; B60L 2210/10; B60L 2240/545; B60L 2240/54; B60W 20/13; B60W 10/26; H02J 7/35; H02J 7/0068; H02J 7/0054; H02J 7/14; H02J 7/0075; H02J 9/062; Y02E 10/566
USPC .................................................. 307/9.1–10.8
See application file for complete search history.

(56) References Cited

U.S. PATENT DOCUMENTS

2006/0118162 A1* 6/2006 Saelzer .................... B60L 8/00
136/246
2010/0090527 A1* 4/2010 Tarnowsky ........ B60H 1/00278
307/10.7
(Continued)

FOREIGN PATENT DOCUMENTS

JP 2014-117000 A 6/2014
JP 2014-183670 A 9/2014
(Continued)

*Primary Examiner* — Rexford N Barnie
*Assistant Examiner* — Terrence R Willoughby
(74) *Attorney, Agent, or Firm* — Dinsmore & Shohl LLP

(57) ABSTRACT

A vehicle includes: a solar panel; a power storage device configured to store electric power generated by the solar panel; and a control device configured to control charging and discharging of thee power storage device such that a state of charge of the power storage device is in a range between an upper limit value and a lower limit value. The control device is configured to set the upper limit value to be larger when an external power supply mode in which the electric power generated by the solar panel is supplied to the outside of the vehicle via the power storage device is selected than when the external power supply mode is not selected.

7 Claims, 6 Drawing Sheets

(51) Int. Cl.

| | | |
|---|---|---|
| *B60W 10/26* | (2006.01) | |
| *B60W 20/13* | (2016.01) | |
| *H02J 7/35* | (2006.01) | |
| *H02J 7/00* | (2006.01) | |
| *B60L 58/13* | (2019.01) | |
| *B60L 58/20* | (2019.01) | |
| *B60L 1/00* | (2006.01) | |
| *H02S 20/30* | (2014.01) | |
| *H02S 10/40* | (2014.01) | |
| *H02J 9/06* | (2006.01) | |
| *H02J 7/14* | (2006.01) | |

(52) U.S. Cl.
CPC ............... *H02J 7/0075* (2013.01); *H02J 7/14* (2013.01); *H02J 9/062* (2013.01); *H02S 10/40* (2014.12); *Y02E 10/566* (2013.01)

(56) References Cited

U.S. PATENT DOCUMENTS

| | | | | |
|---|---|---|---|---|
| 2012/0286052 | A1* | 11/2012 | Atluri | B60K 16/00 237/28 |
| 2014/0132214 | A1* | 5/2014 | Katanoda | B60L 58/16 320/109 |
| 2014/0239908 | A1* | 8/2014 | Ichikawa | H02J 7/0016 320/134 |
| 2015/0162784 | A1* | 6/2015 | Kydd | B60L 11/1811 307/9.1 |
| 2016/0236586 | A1* | 8/2016 | Soo | B60L 11/1862 |
| 2016/0315492 | A1 | 10/2016 | Kawai | |
| 2017/0005489 | A1* | 1/2017 | Kwon | H02J 7/0024 |

FOREIGN PATENT DOCUMENTS

| | | |
|---|---|---|
| JP | 2015-118789 A | 6/2015 |
| JP | 2015-126560 A | 7/2015 |
| JP | 2015-126574 A | 7/2015 |

* cited by examiner

VEHICLE

CROSS-REFERENCE TO RELATED APPLICATIONS

This application claims priority to Japanese Patent Application No. 2016-234294 filed on Dec. 1, 2016 which is incorporated herein by reference in its entirely including the specification, drawings and abstract.

BACKGROUND

1. Technical Field

The disclosure relates to a vehicle, specifically, a vehicle that includes a power storage device that can be charged using a solar panel mounted in the vehicle and a control device that is configured to control charging and discharging of a power storage device at the time of external power supply.

2. Description of Related Art

For example, Japanese Unexamined Patent Application publication No. 2014-183670 (JP 2014-183670 A) discloses a vehicle in which a solar panel is mounted. A vehicle that can perform external power supply of supplying electric power to an electrical device outside the vehicle using an on-board power storage device is also known.

When such a solar panel is mounted on a vehicle that can perform external power supply, external power supply over a long time is possible because the external power supply using the power storage device is performed while generating electric power using the solar panel.

SUMMARY

However, for example, when such external power supply is used in an emergency such as a disaster, there may be a demand for a larger supply amount of power to an electrical device outside the vehicle. Accordingly, in some embodiments, electric power generated by the solar panel be used more effectively than at normal times.

The disclosure provides a vehicle that can effectively use electric power which is generated using a solar panel at the time of external power supply.

According to an aspect of the disclosure, there is provided a vehicle including: a solar panel; a power storage device configured to store electric power generated by the solar panel; and a control device configured to control charging and discharging of the power storage device such that a state ox charge of the power storage device is in a range between an upper limit value and a lower limit value. The control device is configured to set the upper limit value to be larger when an external power supply mode in which the electric power generated by the solar panel is supplied to the outside of the vehicle via the power storage device is selected than when the external power supply mode is not selected.

According to this aspect when the external power supply mode is selected and the power storage device is charged using the solar panel, an amount of stored electric power can be set to increase in comparison with a case in which the external power supply mode is not selected. Accordingly, a larger amount of electric power can be supplied to the outside of the vehicle.

In the aspect, the power storage device may include a first power storage device and a second power storage device. The first power storage device may be configured to store electric power supplied from the second power storage device. The first power storage device may be configured to supply tine electric power to the outside of the vehicle when the external power supply mode is selected. The second power storage device may be configured to store the electric power generated by the solar panel. The control device may be configured to set the upper limit value of the state of charge of the second power storage device to be larger when the external power supply mode is selected than when the external power supply mode is not selected.

According to this configuration, when the external power supply mode is selected and the second power storage device is charged using the solar panel, an amount of stored electric power may be set to increase in comparison with a case in which the external power supply mode is not selected. Accordingly, a larger amount of electric power can be supplied to the outside of the vehicle. It is also possible to decrease the number of times the second power storage device is chained and discharged when the external power supply mode is selected. Accordingly, it is possible to prevent an increase in loss due to an increase in the number of times the device is charged and discharged.

In the aspect, the control device may be configured to set a magnitude of at least one of a limiting value of charging power of the second power storage device and a limiting value of discharging power of the second power storage device to be larger when the external power supply mode is selected than when the external power supply mode is not selected.

For example, when the external power supply mode is selected and the magnitude of the limiting value of the charging power is set to be larger than when the external power supply mode is net selected, charging of the second power storage device can be rapidly performed. When the external power supply mode is selected and the magnitude of the limiting value of the discharging power is set to be larger than when the external power supply mode is not selected, discharging of the second power storage device can be rapidly performed. Accordingly, the electric power generated by the solar panel can be rapidly supplied to the first power storage device.

In the aspect, the control device may be configured to set the lower limit value of the state of charge of the second power storage device to be smaller when the external power supply mode is selected than when the external power supply mode is not selected.

According to this configuration, since a difference between the upper limit value and the lower limit value can be increased it is possible to increase an amount of electric power stored in the second power storage device.

In the aspect, the control device may be configured to select the external power supply mode when selection of the external power supply mode is required by a user.

According to this configuration, it is possible to select the external power supply mode in response to a user's request.

In the aspect, the vehicle may include a communications device configured to communicate with a communication target outside the vehicle. The control device may be configured to select the external power supply mode when a predetermined signal from the outside of the vehicle is received by the communication device.

According to this configuration, it is possible to select the external power supply mode by receiving a predetermined signal via the communication device.

In the aspect, the control device may be configured to charge the first power storage device with the electric power of the second power storage device until the state of charge of the second power storage, device reaches the lower limit value when the state of charge of the second power storage device has reached the upper limit value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
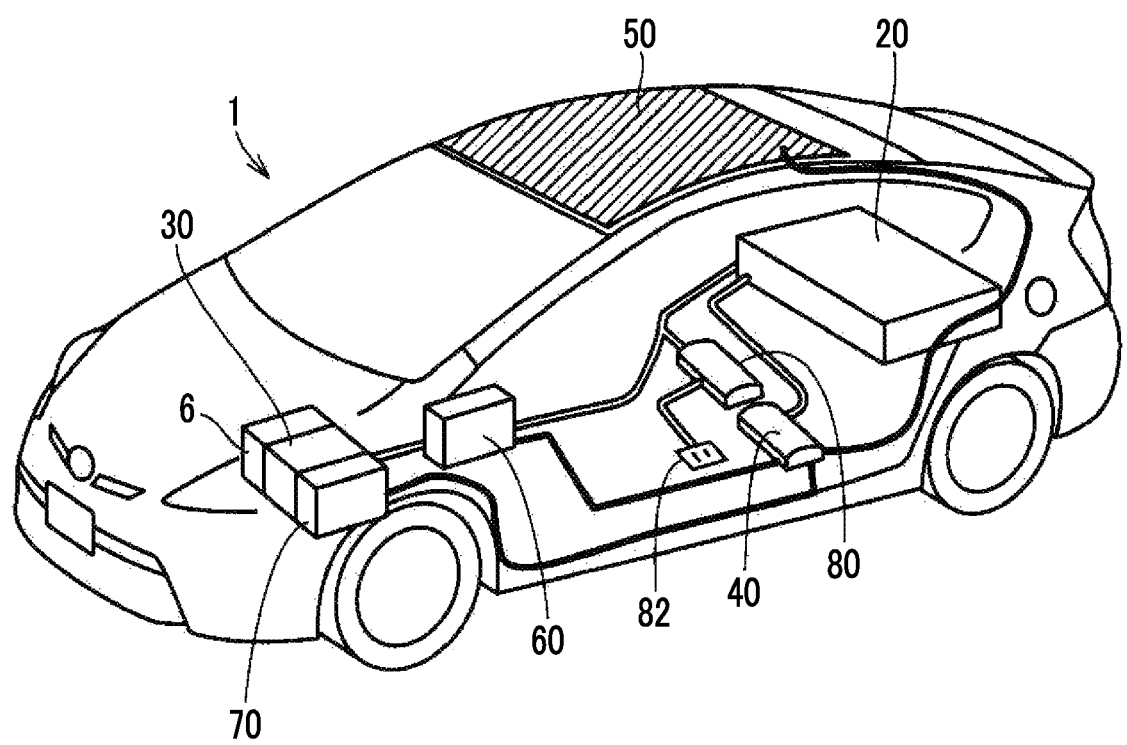
FIG. 1 is a diagram schematically illustrating the entire configuration of a vehicle according to an embodiment of the disclosure.

Hereinafter, an embodiment of the disclosure will be described in detail with reference to the accompanying drawings. In the drawings, the same or corresponding elements will be referenced by the same reference signs and description thereof will not be repeated.

In the following embodiment, an electric vehicle in which a motor generator is mounted as a drive source is described as a vehicle, but the vehicle is not particularly limited as long as a solar panel and a power storage device which will be described below are mounted. Accordingly, the vehicle may be a hybrid vehicle in which an engine is additionally mounted as a drive source or a power source of a power generator or may be a vehicle including only an engine instead of the motor generator.

FIG. 1 is a diagram schematically illustrating the entire configuration of a vehicle 1 according to an embodiment of the disclosure. As illustrated in FIG. 1, the vehicle 1 according to this embodiment includes a battery pack 20, a power control unit (PCU) 30, a solar PCU 40, a solar panel 50, a solar battery 60, an auxiliary machine battery 70, an AC 100 V inverter 80, and a socket 82.

The battery pack 20 is a DC power source which is rechargeable. The battery pack 20 includes a secondary battery such as a nickel-hydride battery or a lithium-ion battery. The battery pack 20 gives and takes electric power to and from a motor generator 6 (hereinafter referred to as an MG 6) which is a drive source of the vehicle 1. Electric power of the battery pack 20 is supplied to the MG 6 via the PCU 30. The battery pack 20 is charged with electric power generated by the MG 6. The battery pack 20 may be charged with electric power supplied from a power source (not illustrated) outside the vehicle 1. The battery pack 20 is not limited to the secondary battery, and may be a device that can give and take direct current (hereinafter, referred to as DC) power to and from the PCU 30, for example, a capacitor. The battery pack 20 is disposed, for example, at a position behind rear seats of the vehicle 1 and between wheelhouses of right and left rear wheels.

The PCU 30 converts DC power of the battery pack 20 into alternative current (hereinafter, referred to as AC) power and supplies the AC power to the MG 6, or converts regenerative power (AC power) generated by the MG 6 into DC power and supplies the DC power to the battery pack 20.

The PCU 30 includes, for example, a converter and an inverter (neither of which is illustrated) each including a plurality of switching elements. The converter and the inverter operate by ON and OFF control of the switching elements. The converter steps up a voltage of PC power supplied from tie battery pack 20 and outputs the stepped-up power to the inverter. The inverter converts DC power output from the converter into AC power and outputs the AC power to the MG 6. Accordingly, the MG 6 is driven using the electric power stored in the battery pack 20.

The inverter converts AG power generated by the MG 6 into DC power and outputs the DC power to the converter. The converter steps down a voltage of the DC power output from the inverter and outputs the stepped-down DC power to the battery pack 20. Accordingly, the battery pack 20 is charged with the electric power generated by the MG 6. The converter may be omitted.

The PCU 30 further includes a DC/DC converter (not illustrated) that converts a voltage of the battery pack 20 into a voltage suitable for charging the auxiliary machine battery 70. The DC/DC converter charges the auxiliary machine battery 70 by supplying the converted electric power to the auxiliary machine battery 70.

The solar panel 50 is a solar cell that converts optical energy (for example light energy of solar light) into DC power and is a power generator that generates electric power for charging the solar battery 60. In this embodiment, the solar panel 50 is installed on the surface of a roof of the vehicle 1 as illustrated in FIG. 1. The electric power generated by the solar panel 50 is supplied to the solar battery 60 via the solar PCU 40. The solar panel 50 may be installed on the surface of a place other than the roof of the vehicle 1 (for example, a hood).

The solar battery 60 is a power stooge device that stores electric power generated by the solar panel 50. The solar battery can also include a secondary battery such as a nickel-hydride battery or a lithium-ion battery. The solar battery 60 has a configuration in which a plurality of (for example, three) cells or modules including a plurality of cells are connected in series. The solar battery 60 is disposed at a predetermined position (for example, below a center console) in an interior of the vehicle 1. The interior of the vehicle 1 includes a space (for example, a cabin) in the vehicle 1 which an occupant boards and a space (for example, a cargo room) communicating with the space.

Figure 2:
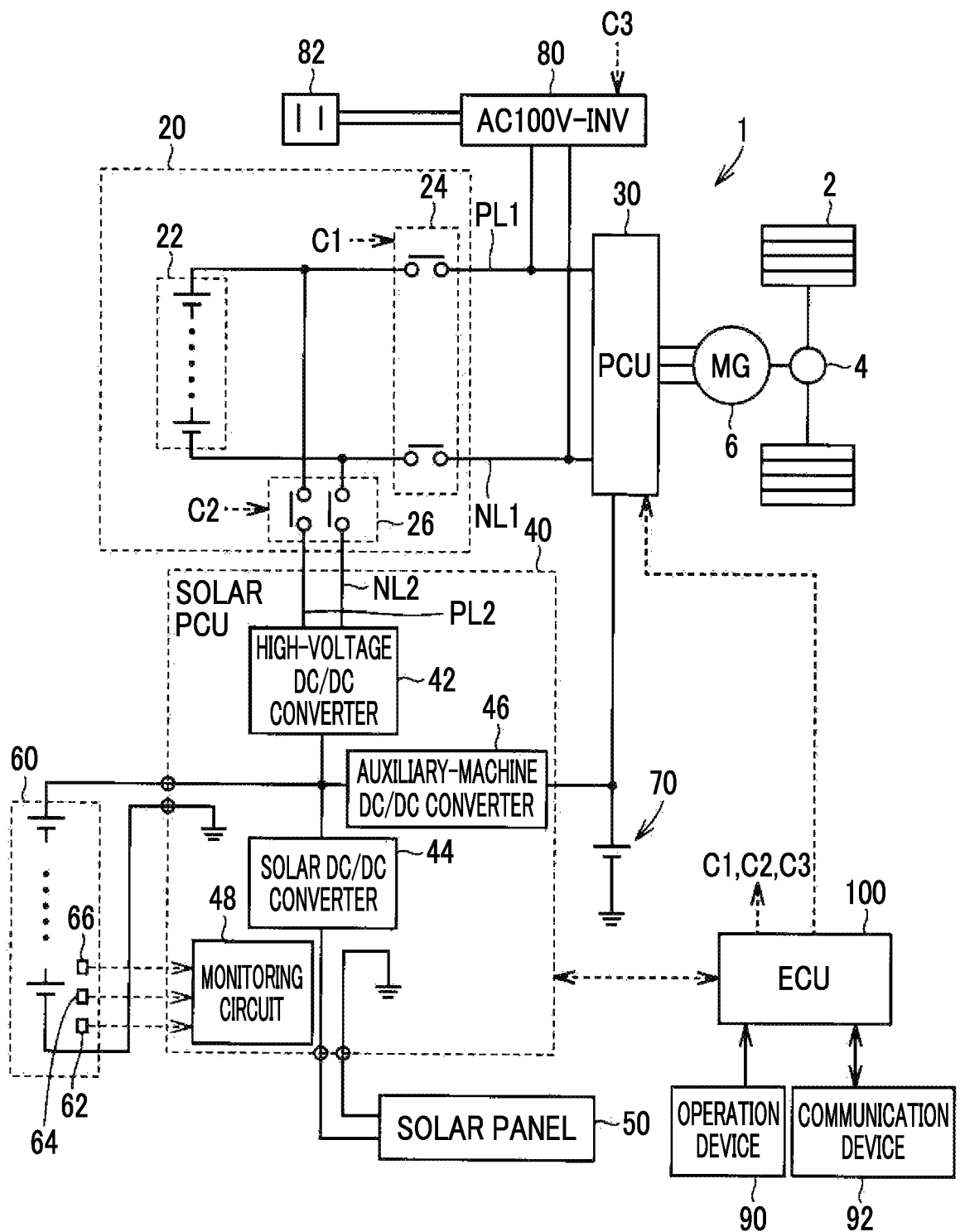
FIG. 2 is a block diagram illustrating a configuration of devices mounted in the vehicle according to the embodiment.

The solar PCU 40 converts DC power output from the solar panel 50 into a voltage which can charge the solar battery 60 or converts DC power of the solar battery 60 into a voltage which can charge the battery pack 20 in accordance with a control signal from an electronic control unit (ECU) 100 (see FIG. 2). For example, when a state of charge (SOC) of the solar battery 60 increases to an upper limit value, the solar PCU 40 supplies the electric power of the solar battery 60 to the battery pack 20 or charges the auxiliary machine battery 70. For example, when the SOC of the solar battery 60 decreases to a lower limit value, the solar PCU 40 charges the solar battery 60 using electric power output from the solar panel 50.

The auxiliary machine battery 70 supplies electric power to an auxiliary machine load (not illustrated). Examples of the auxiliary machine load include electric devices (such as a car navigation system and an audio device) disposed in the interior of the vehicle 1 and various ECUs which are mounted in the vehicle 1.

The socket 82 has a shape to which a plug connected to an electrical device can be attached. In this embodiment, the socket 82 is disposed in the interior of the vehicle 1. The socket 82 is supplied with AC power of 100 V from the AC 100 V inverter 80 when the AC 300 V inverter 80 is activated.

The elements which are mounted in the vehicle 1 will be described below in detail with reference to FIG. 2. FIG. 2 is a block diagram illustrating devices which are mounted in the vehicle 1 according to this embodiment. As illustrated in FIG. 2, the vehicle 1 further includes driving wheels 2, a power transmission gear 4, an MG 6, and an ECU 100.

The MG 6 is, for example, a three-phase AC electrical rotary machine. An output torque of the MG 6 is transmitted to the driving wheels 2 via the power transmission gear 4 including a reduction gear. The MG 6 may generate electric power using a rotational force of the driving wheels 2 at the time of a regenerative braking operation of the vehicle 1. A configuration in which only one motor generator is disposed as a drive source in the vehicle 1 is illustrated in FIGS. 1 and 2, but the number of motor generators is not limited thereto and a plurality of (for example, two) motor generators may be provided.

The battery pack 20 includes an assembled, battery 22, a system main relay (hereinafter referred to as an SME) 24, and a charging relay (hereinafter referred to as a CHR) 26.

The assembled battery 22 has a configuration in which a plurality of modules each including a plurality of cells are connected in series. Alternatively, the assembled battery 22 may have a configuration in which a plurality of cells are connected in series. The voltage of the assembled battery 22 is, for example, about 200 V.

The SMR 24 is disposed on power lines PL1 and NL1 that connect the PCU 30 and the assembled battery 22. The SMR 24 switches the PCU 30 and the assembled battery 200 between an electrically connected state (an ON state) and an electrically disconnected state (an OFF state) based on a control signal C1 from the ECU 100.

The CHR 26 is disposed on power lines PL2 and NL2 that branch from the power lines PL1 and NL1 connecting the assembled battery 22 and the SMR 24 and are connected to the solar PCU 46. The CHR 26 switches the power lines PL1 and NL1 and the solar PCU 48 between an electrically connected state (an ON state) and an electrically disconnected state (an OFF state) based on a control signal C2 from the ECU 100.

The solar PCU 40 includes a high-voltage DC/DC converter 42, a solar DC/DC converter 44, an auxiliary-machine DC/DC converter 46, and a monitoring circuit 48.

The high-voltage DC/DC converter 42 converts DC power of the solar battery 60 into DC power which can charge the assembled battery 22 in accordance with a control signal from the ECU 100. The high-voltage DC/DC converter 42 supplies the converted electric power to the assembled battery 22. The electric power output from the high-voltage DC/DC converter 42 may also be supplied to the AC 100 V inverter 80 in addition to the assembled battery 22 when the AC 100 V inverter 80 is activated.

The solar DC/DC converter 44 converts DC power supplied from the solar panel 50 into DC power that can charge the solar battery 60 based on a control signal from the ECU 100. The solar DC/DC converter 44 supplies the converted electric power to the solar battery 60.

The auxiliary-machine DC/DC converter 46 converts DC power of the solar battery 60 into DC power that can charge the auxiliary machine battery 70 based on a control signal from the ECU 100. The auxiliary-machine DC/DC converter 46 supplies the converted electric power to the auxiliary machine battery 70.

The monitoring circuit 48 monitors a state of the solar battery 60. A temperature sensor 62, a voltage sensor 64, and a current sensor 66 are provided in the solar battery 60. The temperature sensor 62 detects a temperature of the solar battery 60 (hereinafter referred to as a battery temperature) TBs and transmits a signal indicating the detected battery temperature TBs to the monitoring circuit 48. The voltage sensor 64 detects a voltage VBs of the solar battery 60 as a whole and transmits a signal indicating the detected voltage VBs to the monitoring circuit 48. The current sensor 66 detects a current IBs of the solar battery 60 and transmits a signal indicating the detected current IBs to the monitoring circuit 48.

The monitoring circuit 48 outputs information on -the state of the solar battery 60 to the ECU 100. For example, the monitoring circuit 48 outputs detection results received from the sensors to the ECU 100, or performs a predetermined calculation process on the detection results received from the sensors and outputs the process results to the ECU 100. Specifically, the monitoring circuit 48 calculates the SOC of the solar battery 60 based on the temperature TBs, the voltage VBs, and the current IBs of the solar battery 60 and outputs information indicating the calculated SOC to the ECU 100.

For example, the monitoring circuit 48 may estimate an open-circuit voltage (OCV) based on the current IBs, the voltage VBs, and the temperature TBs of the solar battery 60, and may estimate the SOC of the solar battery 60 based on the estimated OCV and a predetermined map. Alternatively, the monitoring circuit 48 may estimate the SOC of the solar battery 60, for example, by integrating a charging current and a discharging current of the solar battery 60.

A positive input terminal and a negative input terminal of the AC 100 V inverter 80 are connected to the power lines PL1 and NL1, respectively. An output terminal of the AC 100 V inverter 80 is connected to the socket 82. The AC 100 V inverter 80 converts DC power supplied from the battery pack 20 into AC power of 100 V and supplies the converted AC power to the socket 82 in accordance with a control signal C3 from the ECU 100.

An operation device 90 is an operation device that is used for a user to request the vehicle 1 to select the external power supply mode and is constituted, for example, by a switch. The operation device 90 is connected to the ECU 100. When the operation device 90 is operated by a user (when the switch is turned on), the operation device 90 transmits a signal indicating that the operation device 90 is operated (an ON signal of the switch) to the ECU 100.

A communication device 92 is configured to receive a signal, for example, from an external communication base station. The communication device 92 receives, for example, information indicating an emergency such as disaster information. When the information is received, the communication device 92 transmits a signal indicating that the information has been received to the ECU 100. The communication device 92 can perform communication, for example, based on a predetermined radio communication standard. Examples of the predetermined radio communication standard include various mobile phone communication standards such as 3G, 4G, and 5G.

The ECU 100 includes a central processing unit (CPU), a memory which is a storage device, and input and output buffers, none of which is illustrated. The ECU 100 controls various devices such that the vehicle 1 in a desired operating state based on signals from various sensors and devices and maps and programs stored in the memory. Such control is not limited to processing by software, but may be performed by dedicated hardware (electronic circuits).

The ECU 100 acquires the SOC of the solar battery 60 from the monitoring circuit 48. The process of calculating the SOC which is performed by the monitoring circuit 48 may be performed by the ECU 100. When the SOC of the solar battery 60 reaches a lower limit value, the ECU 100 activates the solar DC/DC converter 44 to charge the solar battery 60 with electric power output from the solar panel 50.

When the SOC of the solar battery 60 reaches an upper limit value, the ECU 100 stops charging of the solar battery 60 and turns on the CHR 26. The ECU 100 activates the high-voltage DC/DC converter 42 to supply electric power of the solar battery 60 to the battery pack 20. The ECU 100 may activate the solar DC/DC converter 44 in addition to the high-voltage DC/DC converter 42 to supply electric power to the battery pack 20. When the SOC of the solar battery 60 reaches the lower limit value or the SOC of the assembled battery 22 reaches the upper limit value, the ECU 100 stops the operation of the high-voltage DC/DC converter 42 and turns off the CHR 26 to stop supply of electric power to the battery pack 20.

The ECU 100 controls charging and discharging of the solar battery 60 such that the SOC of the solar battery 60 is in a range between the upper limit value and the lower limit value by activating the CHR 26 and the solar PCU 40 as described above.

For example, when a predetermined operation a switch turning-on operation) is performed on the operation device 90 while the vehicle 1 is stopped or when a signal indicating an emergency received via the communication device 92 while the vehicle 1 is stopped, the ECU 100 controls the vehicle 1 in accordance with the external power supply mode.

When the vehicle 1 is controlled in accordance with the external power supply mode, the ECU 100 can supply AC power to the socket 82 by turning on the SMR 24 and activating the AC 100 V inverter 80. Accordingly, when a plug disposed in an electrical device is connected to the socket 82, the electrical device can operate. Supply of electric power from the solar battery 60 to the battery pack 20 is continuously performed even in the external power supply mode. That is, when the SOC of the solar battery 60 reaches the upper limit value, electric power is supplied from the solar battery 60 to the battery pack 20 by turning on the CHR 26 and activating the high-voltage DC/DC converter 42. The electric power supplied from the solar battery 60 to the battery pack 20 is supplied to the AC 180 V inverter 80 via the SMR 24 or is used to charge the assembled battery 22.

In the vehicle 1 having the above-mentioned configuration, for example, when, the external power supply mode is selected, the ECU 100 can charge the solar battery 60 using the solar panel 50 and supply electric, power of the solar battery 60 to the outside of the vehicle 1 as described above. Thus, it is possible to perform external power supply for a long time. Accordingly, when the external power supply mode is assumed to be used in an emergency such as a disaster, there is demand for a larger supply amount of electric power to an electrical device outside the vehicle 1. Accordingly, in this case, the electric power generated by the solar panel 50 has to be effectively used.

Therefore, in this embodiment, when the external power supply mode in which the electric power generated by the solar panel 50 can be supplied to the outside of the vehicle 1 via the solar battery 60 is selected, the ECU 100 sets the upper limit value of the SOC of the solar battery 60 to be larger when the external power supply mode is not selected. The ECU 100 sets the lower limit value of the SOC of the solar battery 60 to be smaller when the external power supply mode is selected than when the external power supply mode is not selected.

According to this configuration, when the solar battery 60 is charged using the solar panel 50 in a state in which the external power supply mode is selected, the amount of stored electric power can be increased in comparison with a case in which the external power supply mode is not selected. Accordingly, it is possible to supply a larger amount of electric power to the outside of the vehicle 1.

Figure 3:
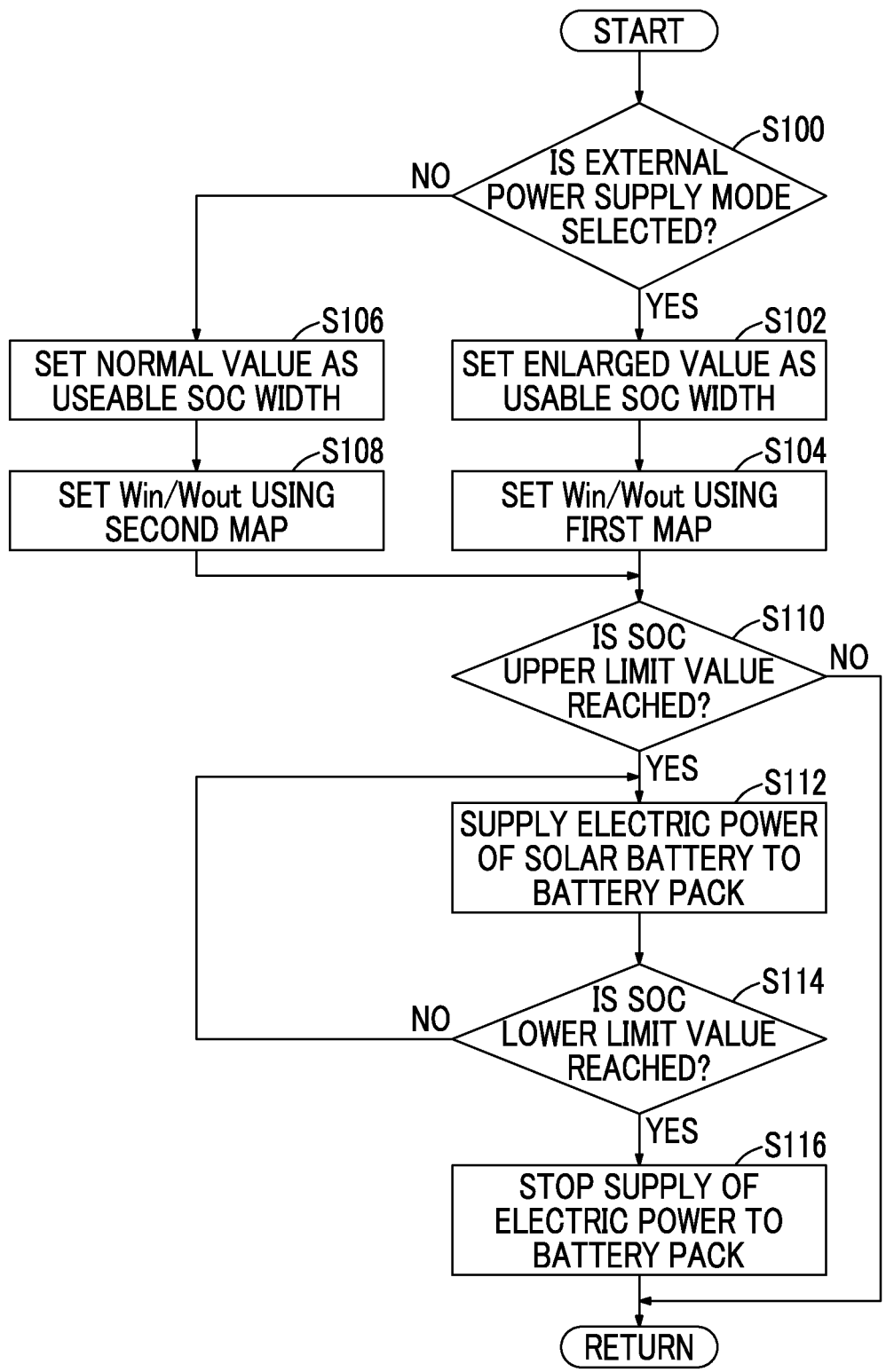
FIG. 3 is a flowchart illustrating a control routine which is performed fey an ECU mounted in the vehicle according to the embodiment.

A control routine which is performed by the ECU 100 will be described below with reference to FIG. 3. FIG. 3 is flowchart illustrating a control routine which is performed by the ECU 100 mounted in the vehicle 1 according to this embodiment.

In Step (hereinafter referred to as "S") 100, the ECU 100 determines whether the external power supply mode is selected. The ECU 100 determines whether the external power supply mode is selected, for example, based on a state of a flag which is turned on when selection of the external power supply mode is requested by a user using the operation device 90 or when a predetermined signal is received via the communication device 92. When it is determined that the external power supply mode is selected (YES in S100), the routine transitions to S102.

In S102, the ECU 100 sets an enlarged value as a u sable SOC width of the solar battery 60. Specifically, the ECU 100 sets SOC_u(1) is set as the upper limit value of the SOC of the solar battery 60. The ECU 100 sets the SOC_1(1) as the lower limit value. SOC_u(1) is a value which is greater than an upper limit value SOC_u(0) used when a normal value is set as the usable SOC width which will be described later. SOC_1(1) is a value which is smaller than a lower limit value SOC_1(0) used when a normal value is set as the usable SOC width which will be described later.

In S104, the ECU 100 sets a limiting value Win of charging power and a limiting value Wout of discharging power using a first map. Specifically, the ECU 100 sets the limiting value Win of charging power and the limiting value Wout of discharging power using the first map which is set as a map indicating a relationship between the battery temperature, the limiting value Win of charging power, and the limiting value Wout of discharging power. The first map is a map which is set such that the magnitude of the limiting value Win of charging power and the limiting value Wout of discharging power are enlarged with respect to the battery temperature when the battery temperature is a high temperature equal to or higher than a predetermined temperature T(0), in comparison with a second map which will be described later.

Figure 4:
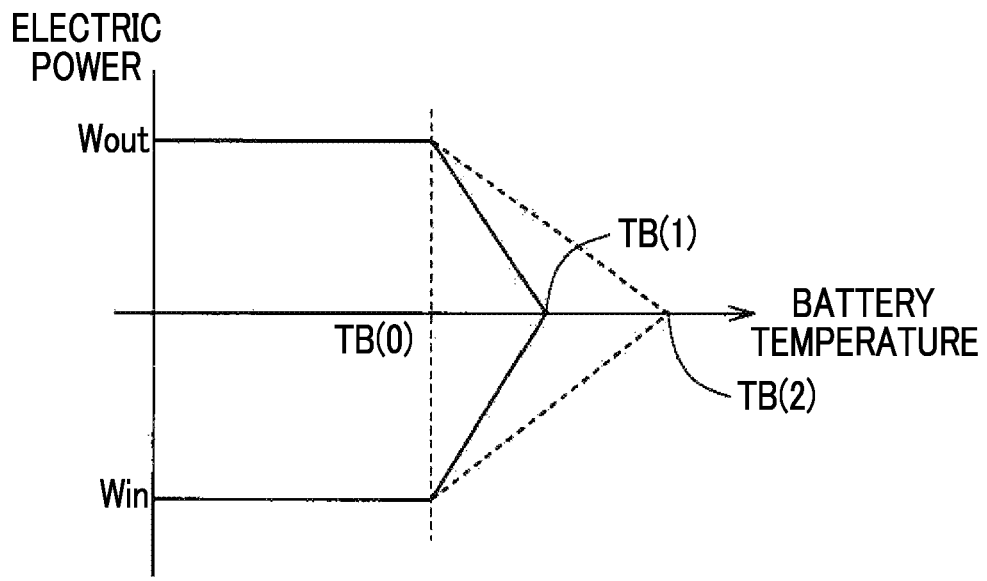
FIG. 4 is a diagram illustrating a relationship between a battery temperature, a limiting value Win of charging power, and a limiting value Wout of discharging power.

FIG. 4 is a diagram illustrating a relationship between the battery temperature, the limiting value Win of charging power, and the limiting value Wout of discharging power. FIG. 4 includes a first map (a dotted line) and a second map (a solid line). In FIG. 4, a solid line part in a battery temperature range in which the battery temperature is lower than TB(0) is common to the first map and the second map. As illustrated in FIG. 4, in the first map, the magnitudes of the limiting value Win of charging power and the limiting value Wout of discharging power are values which decrease linearly as the battery temperature increases in a range in which the battery temperature is higher than T(0) and in which charging and discharging are stopped when the battery temperature reaches TB(2). On the other hand, in the second map, the magnitudes of the limiting value Win of charging power and the limiting value Wout of discharging power are values in which charging and discharging are stopped when the battery temperature reaches TB(1) lower than TB(2).

When it is determined in S100 that the external power supply mode is not selected (NO in S100), the routine transitions to S106.

In S106, the ECU 100 sets a normal value as the usable SOC width of the solar battery 60. Specifically, the ECU 100 sets SOC_u(0) as the upper limit value of the solar battery 60. The ECU 108 sets SOC_l(0) as the lower limit value.

In S108, the ECU 100 sets the limiting value Win of charging power and the limiting value Wout of discharging power using the second map. Specifically, the ECU 100 sets the limiting value Win of charging power and the limiting value Wout of discharging power using the second map which is set as a map indicating a relationship between Win and the battery temperature and a relationship between Wout and the battery temperature. The second map is the same as described above and thus description thereof will not be repeated.

In S110, the ECU 100 determines whether the SOC of the solar battery 60 reaches an SOC upper limit value. The SOC upper limit value is a value which is set depending on whether the external power supply mode is selected as described above. When it is determined that the SOC of the solar battery 60 reaches the SOC upper limit value (YES in S110), the routine transitions to S112.

In S112, the ECU 100 supplies electric power of the solar battery 60 to the battery pack 20 by turning oh the CHR 26 and activating the high-voltage DC/DC converter 42.

In S114, the ECU 100 determines whether the SOC of the solar battery 60 reaches an SOC lower limit value. The SOC lower limit value is a value which is set depending on whether the external power supply mode is selected as described above. When it is determined that the SOC of the solar battery 60 reaches the SOC lower limit value (YES in S114), the routine transitions to S116.

When it is determined that the SOC of the solar battery 60 does not reach the SOC upper limit value (NO in S110), the routine ends. When it is determined that the SOC of the solar battery 60 does not reach the SOC lower limit value (NO in S114), the routine returns to S112.

Figure 5:
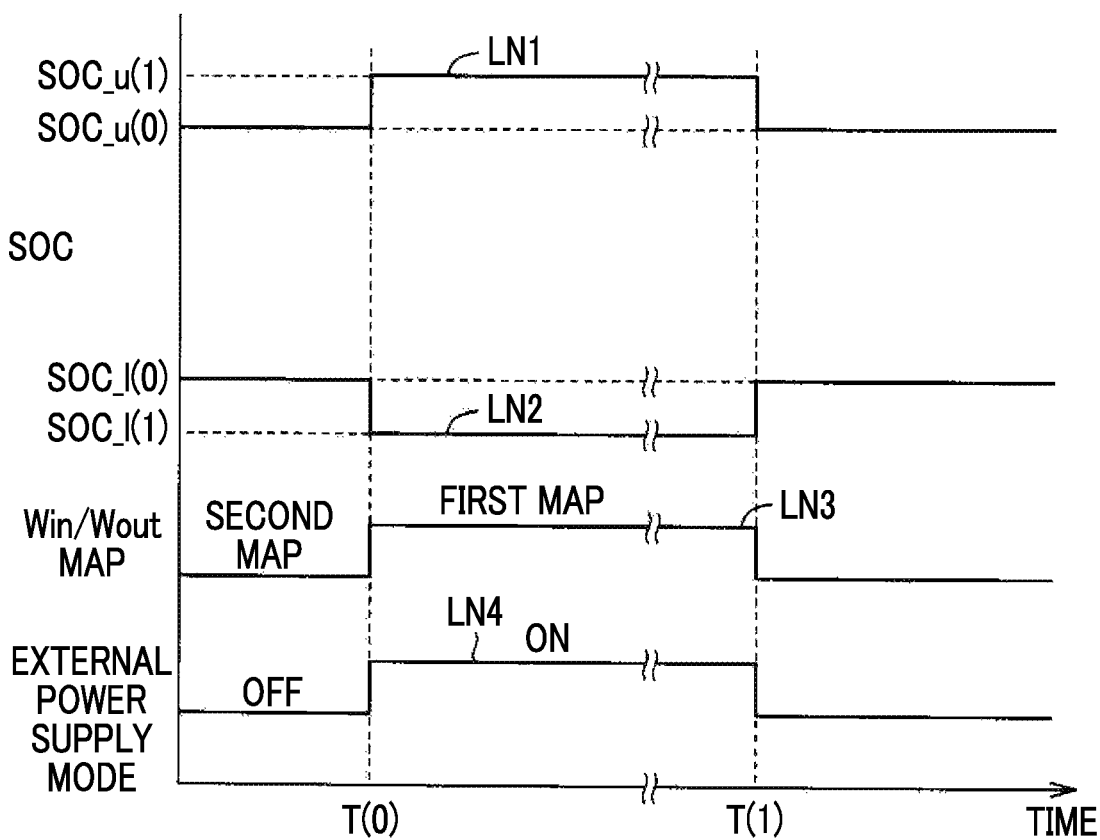
FIG. 5 is a timing chart illustrating operations of the ECU mounted in the vehicle according to the embodiment.

The operation of the ECU 100 of the vehicle 1 according to this embodiment based on the above-mentioned structure and flowchart will be described below with reference to FIG. 5. FIG. 5 is a timing chart illustrating the operation of the ECU 100 mounted in the vehicle 1 according to this embodiment. The horizontal axis of FIG. 5 represents time and the vertical axis of FIG. 5 represents changes of the upper limit value and the lower limit value of the SOC and a state in which the external power supply mode is selected. Specifically, LN1 in FIG. 5 indicates a change of the SOC upper limit value of the solar battery 60. LN2 in FIG. 5 indicates a change of the SOC lower limit value of the solar battery 60. LN3 in FIG. 5 indicates selection states of the first map and the second map. LN4 in FIG. 5 indicates the selection states of the external power supply mode.

For example, it is assumed that the external power supply mode is not selected. Then, as indicated by LN4 in FIG. 5, when the selection state of the external power supply mode is switched to the OFF state (NO in S100), a normal value is set as the usable SOC width of-the solar battery 60 (S106). Accordingly, as indicated by LN1 in FIG. 5, SOC_u(0) is set as the SOC upper limit value of the solar battery 60. As indicated by LN2 in FIG. 5, SOC_1(0) is set as the SOC lower limit value of the solar battery 60. As indicated by LN3 in FIG. 5, the limiting value Win of charging power and the limiting value Wout of discharging power are set using the second map (S108).

In this way, charging and discharging of tire solar battery 60 is controlled such that the SOC of the solar battery 60 is in a range between the upper limit value SOC_u(0) and the lower limit value SOC_1(0).

Specifically, when the SOC of the solar battery 60 reaches the upper limit value (YES in S110), the electric power of the solar battery 60 is supplied to the battery pack 20 by turning on the CHR 26 and activating the high-voltage DC/DC converter 42 (S112). The electric power supplied to the battery pack 20 is supplied to an electrical device via the AC 100 V inverter 80 and the socket 82 or is supplied to the assembled battery 22.

When the electric power of the solar battery 60 is consumed due to the supply of electric power to the battery pack 20, the SOC of the solar battery 60 decreases. When the SOC of the solar battery 60 reaches the SOC lower limit value (YES in S114), the supply of electric power to the battery pack 20 is stopped (S116).

When the external power supply mode is selected by a user's request at time T(0) and the selection state of the external power supply mode is switched to the ON state as indicated by LN4 in FIG. 5 (YES in S100), an enlarged value is set as the usable SOC width of the solar battery 60 (S102). Accordingly, as indicated by LN1 in FIG. 5, the SOC upper limit value increases from SOC_u(G) to SOC_u(1). As indicted by LN2 in FIG. 5, the SOC lower limit value decreases from SOC_u(0) to SOC_1(1). As indicated by LN3 in FIG. 5, the limiting value Win of charging power and the limiting value Wout of discharging power are set using the first map (S104).

As a result, the usable SOC width of the solar battery 60 is enlarged and an amount of electric power stored in the solar battery 60 increases. Accordingly, supply of electric power is started after the SOC of the solar battery 60 reaches the upper limit value, and an amount of supplied electric power increases until the SOC of the solar battery 60 reaches the lower limit value. Accordingly, when the SOC of the assembled battery 22 decreases, the SOC of the assembled battery 22 can be rapidly recovered.

In the solar battery 60, when charging using the solar panel 50 and discharging to the battery pack 20 are repeated, an amount of electric power supplied for each time increases. Accordingly, when a predetermined amount of electric power is supplied from the solar battery 60 to the battery pack 20 by repeatedly performing charging and discharging, it is possible to reduce the number of times in which the solar battery 60 is charged and discharged by enlarging the usable SOC width. As a result, since the number of times of changing the operations of the high-voltage DC/DC converter 42 and the solar DC/DC converter 44 can be decreased, it is possible to suppress an increase in loss.

When the external power supply mode is released by a user's request at time T(1) and the selection state of the external power supply mode is switched to the OFF state as indicated by LN4 in FIG. 5 (NO in S100), a normal value is set as the usable SOC width of the solar battery 60 (S106). Accordingly, as indicated by LN1 in FIG. 5, the SOC upper limit value decreases from SOC_u(1) to SOC_u(0). As indicated by LN2 in FIG. 5, the SOC lower limit value increases from SOC_1(1) to SOC_1(0). As indicated by LN3 in FIG. 5, the limiting value Win of charging power and the limiting value Wout of discharging power are set using the second map (S108).

As described above, in the vehicle according to this embodiment, when the external power supply mode is selected, the SOC upper limit value of the solar battery 60 is set to be larger than when the external power supply mode is not selected. Accordingly, when the solar battery 60 is charged using the solar panel 50 in a state in which the external power supply mode is selected, the amount of stored electric power can be set to be larger than when the external power supply mode is not selected. Accordingly, a larger amount of electric power can be supplied to the outside of the vehicle. It is also possible to reduce the number of times in which the solar battery 60 is charged and discharged in a state in which the external power supply mode is selected. Thus, it is possible to suppress increase in energy loss due to the increase of the number of times in which the solar battery is charged and discharged. Accordingly, it is possible to provide a vehicle that can effectively use electric power using the solar panel at the time of external power supply.

In this embodiment. The ECU 100 sets the magnitude of the limiting value (Win) of charging power and the limiting value (Wout) of discharging power of the solar battery 60 at a high temperature to be larger when the external power supply mode is selected than when the external power supply mode is not selected.

Accordingly, when the solar battery 66 is charged using the solar panel 50 in a state in which the external power supply mode is selected, charging of the solar battery 60 at a high temperature can be more rapidly performed than when the external power supply mode is not selected. When the electric power of the solar battery 60 is supplied to the battery pack 20 in a state in which the external power supply made is selected, discharging of the solar battery 60 at a high temperature can be more rapidly performed than when the external power supply mode is not selected.

Modified examples will be described below. In the above-mentioned embodiment, the ECU 100 sets the magnitude of the limiting value Win of charging power and the magnitude of the limiting value Wout of discharging power of the solar battery 60 to be larger when the external power supply mode is selected than when the external power supply mode is not selected, but at least one of the limiting value Win of charging power and the limiting value Wout of discharging power can be set to be larger.

In the above-mentioned embodiment, the ECU 100 sets the magnitudes of the limiting value Win of charging power and the limiting value Wout of discharging power of the solar battery 60 at a high temperature to be larger when the external power supply mode is selected than when the external power supply mode is not selected, but the magnitudes of the limiting value Win of charging power and the limiting value Wout of discharging power of the solar battery 60 in the entire temperature range may be set to be larger when the external power supply mode is selected than when the external power supply mode is not selected.

In the above-mentioned embodiment, the socket 82 is disposed in the interior of the vehicle 1, but may be disposed, for example, in an exterior of the vehicle 1.

In the above-mentioned embodiment, the external power supply mode is selected based on a signal from the operation device 90 or the communication device 92 and an enlarged value is set as the usable SOC width, but different enlarged values may be set as the usable SOC width when the external power supply mode is selected using the operation device 90 and when the external power supply mode is selected using the communication device 92.

For example, the usable SOC width or the SOC upper limit value may tie set to be larger when an emergency external power supply mode is selected by receiving a predetermined signal such as disaster information from the communication device 92, or the usable SOC width or the SOC upper limit value may be set to be larger when the emergency external power supply mode is selected by a user's request using the operation device. In this case, it is possible to set an appropriate enlarged value depending on the method of selecting the external power simply mode.

In the above-mentioned embodiment, the usable SOC width is enlarged more when the external power supply mode is selected than when the external power supply mode is not selected, but when the external power supply mode is set as an emergency external power supply mode for supplying power to the outside in a disaster, values (for example, a maximum value and a minimum value of the SOC in view of the specifications of the solar battery 60) obtained by enlarging the usable SOC width as much as possible may be set as the enlarged values.

In the above-mentioned embodiment, the upper limit value is increased and the lower limit value is decreased in the aspect in which the enlarged values of the usable SOC width are set, but only the upper limit value may be increased. In this case, it is also possible to increase an amount of electric power stored in the solar battery 60.

Figure 6:
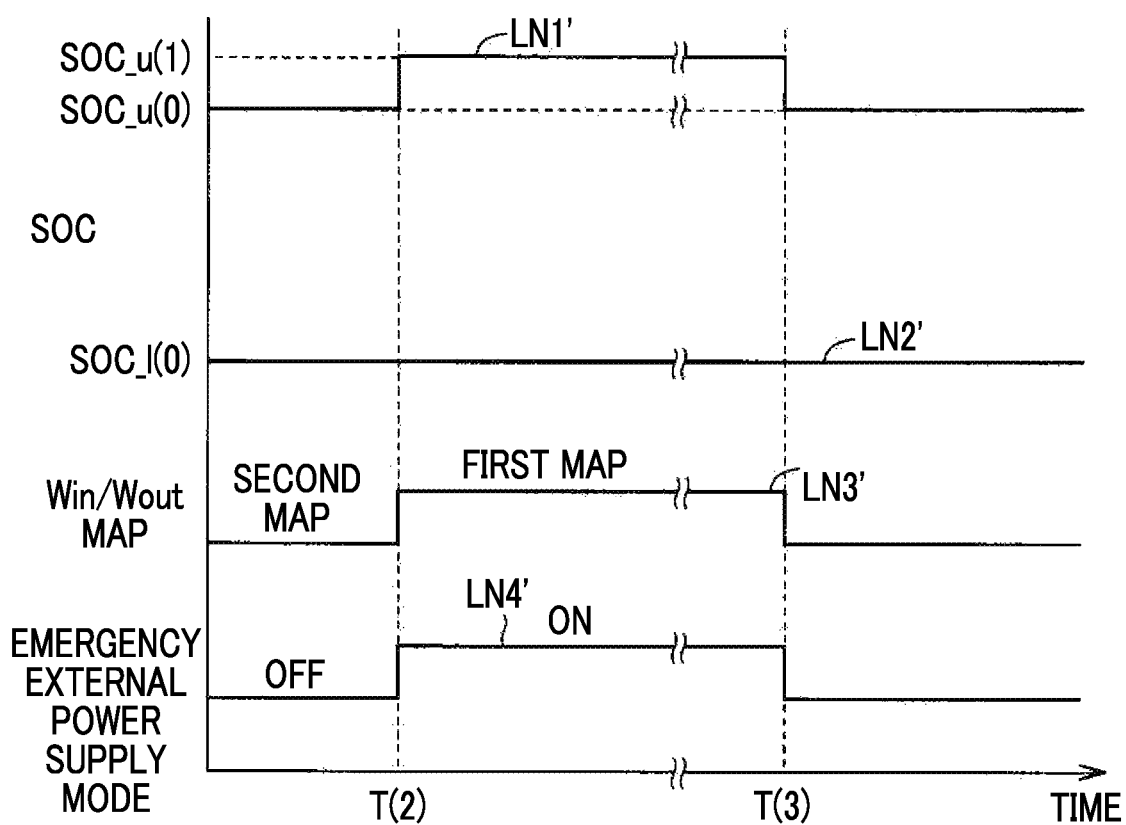
FIG. 6 is a timing chart illustrating operations of an ECU according to a modified example.

The operation of the ECU 100 of the vehicle 1 according to a modified example will be described below with reference to FIG. 6. FIG. 6 is a timing chart illustrating the operation of the ECU 100 mounted in the vehicle 1 according to the modified example. The horizontal axis of FIG. 6 represents time and the vertical axis of FIG. 6 represents changes of the upper limit value and the lower limit value of the SOC and a state in which the external power supply mode is selected. LN1' in FIG. 6 indicates a change of the SOC upper limit value of the solar battery 60. LN2' in FIG. 6 indicates a change of the SOC lower limit value of the solar battery 60. LN3' in FIG. 6 indicates selection states of the first map and the second map. LN4' in FIG. 6 indicates the selection state of the external power supply mode.

For example, it is assumed that the external power supply mode is not selected. Then, as indicated by LN4' in FIG. 6, when the external power supply mode is not selected (NO in S100), a normal value is set as the usable SOC width of the solar battery 60 (S106). Accordingly as indicated by LN1' in FIG. 6. SOC_u(0) is set as the SOC upper limit value of the solar battery 60. As indicated by LN2' in FIG. 6, SOC_1(0) is set as the SOC lower limit value of the solar battery 60. As indicated by LN3' in FIG. 6, the limiting value Win of charging power and the limiting value Wout of discharging power are set using the second map (S108).

In this way, charging and discharging of the solar battery 60 is controlled such that the SOC of the solar battery 60 is in a range between the upper limit value SOC_u(0) and the lower limit value SOC_1(0).

When the selection state of the external power supply mode is switched to the ON state at time T(2) as indicated by LN4' in FIG. 6 (YES in S100), an enlarged value is set as the usable SOC width of the solar battery 60 (S102).

Accordingly, as indicated by LN1' in FIG. 6, the SOC upper limit value increases from SOC_u(0) to SOC_u(1). On the other hand, as indicted by LN2' in FIG. 6, SOC_(0) is maintained as the SOC lower limit value. As indicated by LN3' in FIG. 6, the limiting value Win of charging power and the limiting value Wout of discharging power are set using the first map (S104).

When the selection state of the external power supply mode is switched to the OFF state at time T(3) as indicated by LN4' in FIG. 6 (NO in S100), a normal value is set as the usable SOC width of the solar battery 60 (S106). Accordingly, as indicated by LN1' in FIG. 6, the SOC upper limit value decreases from SOC_u(1) to SOC_u(0). As indicated by LN2' in FIG. 6, SOC_1(0) is maintained as the SOC lower limit value. As indicated by LN3', the limiting value Win of charging power and the limiting value Wout of discharging power are set using the second map (S108).

In this case, when the solar battery 60 is charged using the solar panel 50 in a state in which the external power supply mode is selected, the amount of stored electric power can also be set to be larger than when the external power supply mode is not selected.

Figure 7:
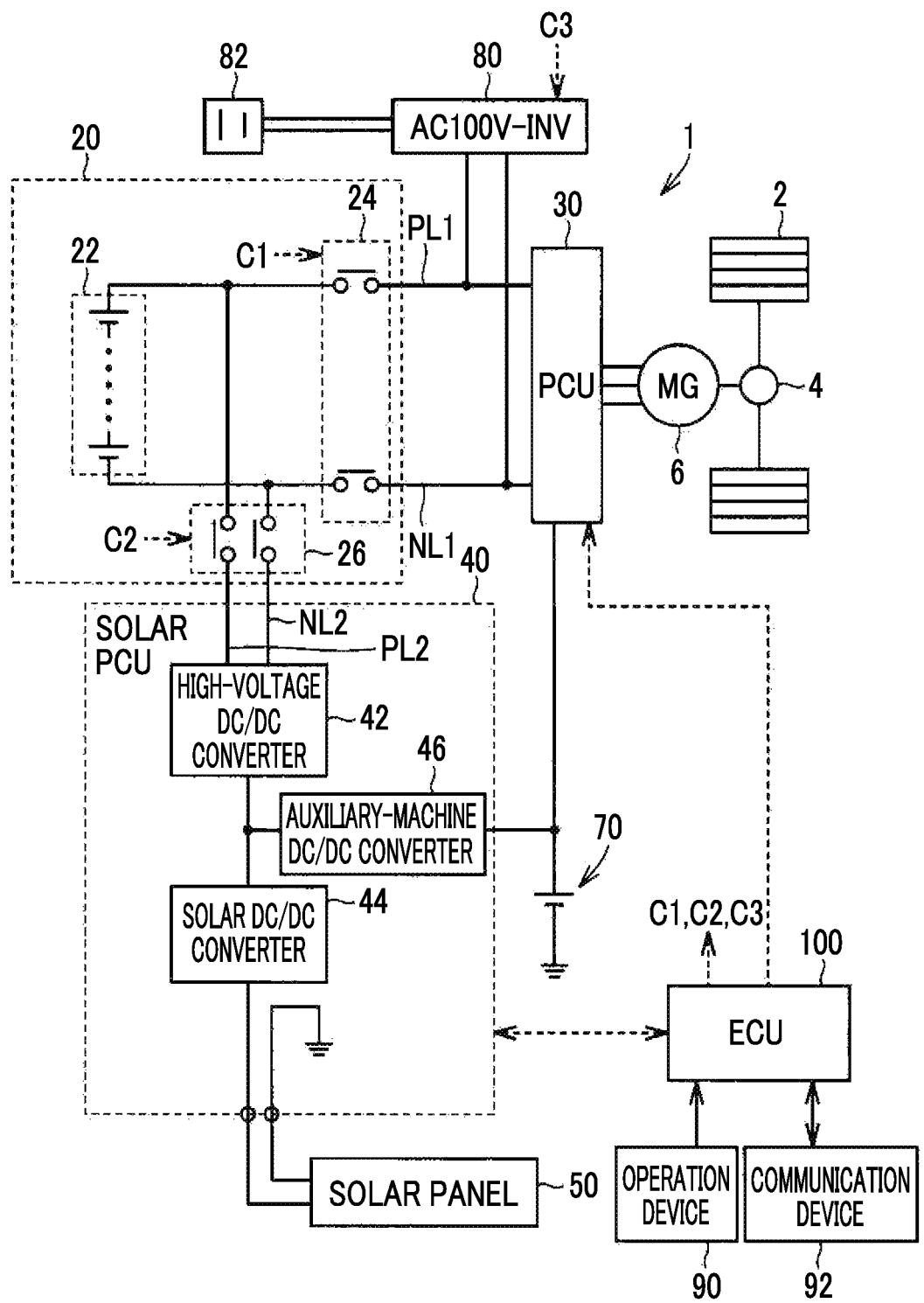
FIG. 7 is a block diagram illustrating a configuration of devices which are mounted in the vehicle according to the modified example.

In the above-mentioned embodiment, the assembled battery 22 is charged using the solar battery 60 and the electric power of the assembled battery 22 is supplied to the outside of the vehicle 1 when the external power supply mode is selected, and the solar battery 60 is charged with electric power generated by the solar panel 50, but the solar battery 60 may be omitted as illustrated in FIG. 7. FIG. 7 is a block diagram illustrating configurations of devices mounted in the vehicle according to a modified example. That is, the electric power generated by the solar panel 50 may be directly supplied to the battery pack 20. In this case, when the external power supply mode is selected, the SOC upper limit value of the assembled battery 22 is set to be larger than the SOC upper limit value of the assembled battery 22 when the external-power supply mode is not selected. In this case, when the assembled battery 22 is charged using the solar panel 50 in a state in which the external power supply mode is selected, the amount of stored electric power can be set to be larger than when the external power supply mode is not selected.

All or some of the above-mentioned modified examples may be appropriately combined for embodiment. It should be noted that the above-mentioned embodiments are exemplary but not restrictive from all the points of view. The scope of the disclosure is defined by the appended claims, not by the above description, and includes all modifications within the meaning and scope equivalent to the claims.

What is claimed is:

1. A vehicle comprising:
a solar panel;
a power storage device configured to store electric power generated by the solar panel; and
a control device configured to control charging and discharging of the power storage device such that a state of charge of the power storage device is in a range between an upper limit value and a lower limit value,
wherein the control device is configured to set the upper limit value to be larger when an external power supply mode in which the electric power generated by the solar panel is supplied to an outside of the vehicle via the power storage device is selected than the upper limit value when the external power supply mode is not selected.

2. The vehicle according to claim 1, wherein
the power storage device includes a first power storage device and a second power storage device,
the first power storage device is configured to store electric power supplied from the second power storage device,
the first power storage device is configured to supply the electric power to the outside of the vehicle when the external power supply mode is selected,
the second power storage device is configured to store the electric power generated by the solar panel, and
the control device is configured to set the upper limit value of the state of charge of the second power storage device to be larger when the external power supply mode is selected than the upper limit value when the external power supply mode is not selected.

3. The vehicle according to claim 2, wherein
the control device is configured to set a magnitude of at least one of a limiting value of charging power of the second power storage device and a limiting value of discharging power of the second power storage device to be larger when the external power supply mode is selected than when the external power supply mode is not selected.

4. The vehicle according to claim 2, wherein
the control device is configured to set the lower limit value of the state of charge of the second power storage device to be smaller when the external power supply mode is selected than the lower limit value when the external power supply mode is not selected.

5. The vehicle according to claim 1, wherein
the control device is configured to select the external power supply mode when selection of the external power supply mode is required by a user.

6. The vehicle according to claim 1, further comprising a communication device configured to communicate with a communication target outside the vehicle, wherein
the control device is configured to select the external power supply mode when a predetermined signal from the outside of the vehicle is received by the communication device.

7. The vehicle according to claim 4, wherein
the control device is configured to charge the first power storage device with the electric power of the second power storage device until the state of charge of the second power storage device reaches the lower limit value when the state of charge of the second power storage device has reached the upper limit value.

* * * * *

UNITED STATES PATENT AND TRADEMARK OFFICE
CERTIFICATE OF CORRECTION

PATENT NO. : 10,543,750 B2
APPLICATION NO. : 15/817745
DATED : January 28, 2020
INVENTOR(S) : Yoshifumi Ota and Shuichi Nagata It is certified that error appears in the above-identified patent and that said Letters Patent is hereby corrected as shown below:

On the Title Page

Item (57), abstract, Line 4, delete "thee" and insert --the--, therefor.

In the Specification

In Column 1, Line 49, delete "ox" and insert --of--, therefor.

In Column 2, Line 32, delete "net" and insert --not--, therefor.

In Column 2, Line(s) 55 & 56, delete "communications device" and insert --communication device--, therefor.

In Column 3, Line 18, delete "fey" and insert --by--, therefor.

In Column 4, Line 20, delete "AG power" and insert --AC power--, therefor.

In Column 5, Line 11, delete "300 V inverter" and insert --100 V inverter--, therefor.

In Column 5, Line 30, delete "assembled, battery 22" and insert --assembled battery 22--, therefor.

In Column 5, Line 48, delete "PCU 46" and insert --PCU 40--, therefor.

In Column 5, Line 49, delete "PCU 48" and insert --PCU 40--, therefor.

In Column 6, Line 23, delete "-the" and insert --the--, therefor.

In Column 7, Line 37, before "a switch", insert --(--.

In Column 8, Line 37, delete "u sable" and insert --usable--, therefor.

Signed and Sealed this
Twenty-fourth Day of March, 2020

Andrei Iancu
*Director of the United States Patent and Trademark Office*

CERTIFICATE OF CORRECTION (continued)
U.S. Pat. No. 10,543,750 B2

In Column 10, Line 5, delete "-the" and insert --the--, therefor.

In Column 10, Line 13, delete "tire" and insert --the--, therefor.

In Column 10, Line 37, delete "SOC_u(G)" and insert --SOC_u(0)--, therefor.

In Column 11, Line 29, delete "embodiment." and insert --embodiment,--, therefor.

In Column 11, Line 29, before "ECU 100", delete "The" and insert --the--, therefor.

In Column 11, Line 42, delete "made" and insert --mode--, therefor.

In Column 12, Line 18, delete "simply" and insert --supply--, therefor.

In Column 13, Line 37, delete "external-power" and insert --external power--, therefor.